United States Patent [19]

Dufresne et al.

[11] Patent Number: 5,081,540
[45] Date of Patent: Jan. 14, 1992

[54] HOLOGRAPHIC APPARATUS USING INCOHERENT LIGHT

[75] Inventors: Eric Dufresne, Paris; Pierre Chavel, Chilly Mazarin; Gabriel Sirat, Paris, all of France

[73] Assignee: Etat Francais, represente par le Ministre des Postes, Telecommunications et de l'Espace (Centre National d'Etudes des Telecommunications), France

[21] Appl. No.: 511,577

[22] Filed: Apr. 20, 1990

[30] Foreign Application Priority Data

Apr. 21, 1989 [FR] France ................... 89 05344

[51] Int. Cl.$^5$ .............................. G03H 1/28
[52] U.S. Cl. ........................ 359/30; 359/1; 359/495
[58] Field of Search ............ 350/3.77, 3.6, 3.73, 350/3.83, 3.84, 3.85, 3.86, 401, 162.13, 162.14

[56] References Cited

U.S. PATENT DOCUMENTS 3,558,207  1/1971  Worthington .
4,602,844  6/1986  Sirat et al. ................... 350/3.83
4,976,504  12/1990  Sirat et al. ................... 350/3.73

OTHER PUBLICATIONS

"*Production of Holograms with Incoherent Illumination*", Worthington *J. Opt. Soc. of Am.*, vol. 56, No. 10, Oct. 1966 pp. 1397–1398.
"Wavefront Reconstruction for Incoherent Optics", Lohmann, *J. Opt. Soc. of Am.*, vol. 55, No. 11, Nov. 1965, pp. 1555–1556.
"Conoscopic Holograms", Sirat et al., *Optics Communications*, vol. 65, No. 4, 15 Feb. 1988, pp. 243–249.

*Primary Examiner*—Bruce Y. Arnold
*Assistant Examiner*—J. P. Ryan

[57] ABSTRACT

A holographic apparatus of the type comprising a conoscopic system including a birefringent crystal inserted between two polarizers, wherein the apparatus also includes an aperture angle limiter inserted on the path of the light rays and wherein one of the birefringent crystal and the aperture angle limiter is disposed off the optical axis of the apparatus.

36 Claims, 11 Drawing Sheets

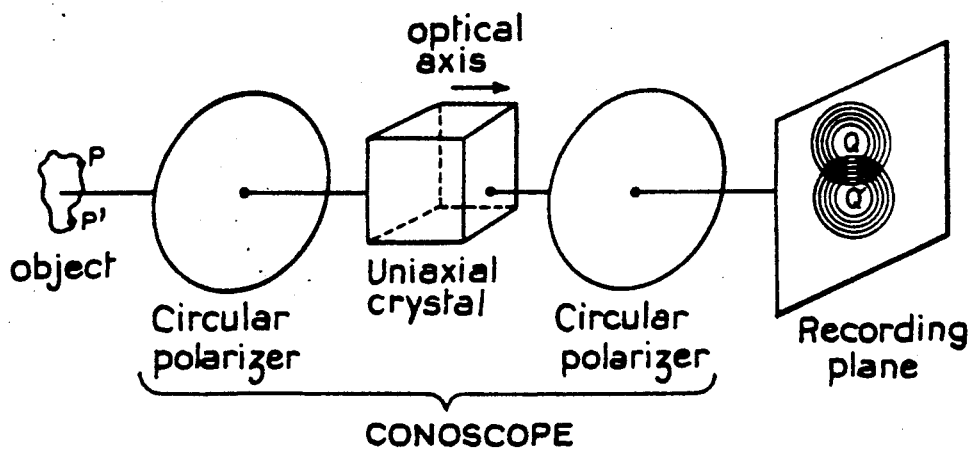
FIG._1 - PRIOR ART
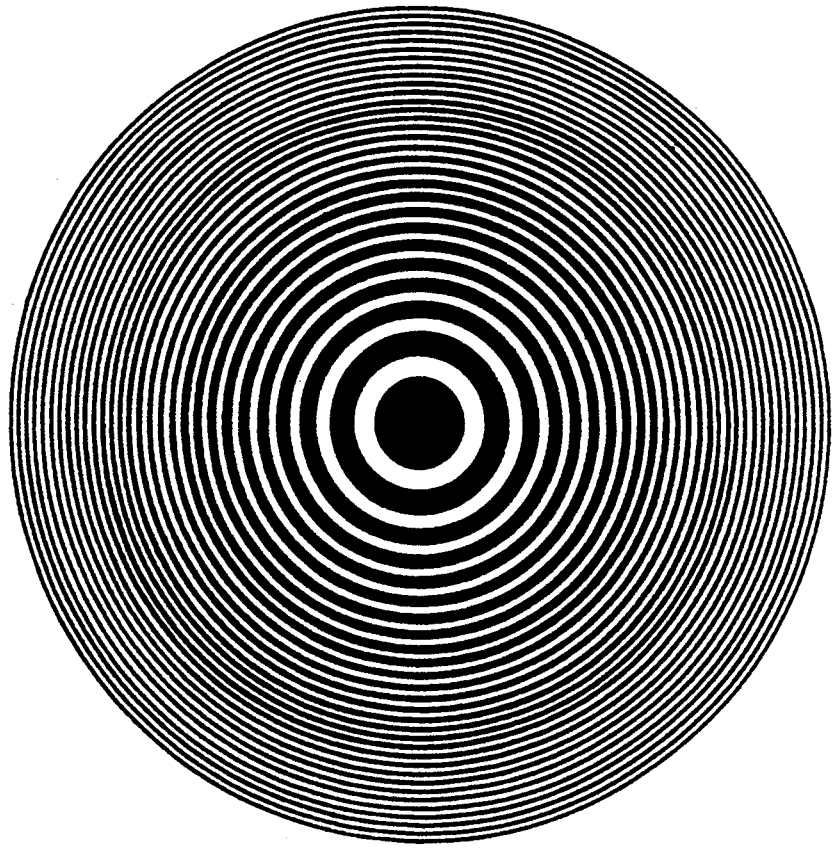
FIG._2  HOLOGRAM OF A POINT

FIG_3
PRIOR ART
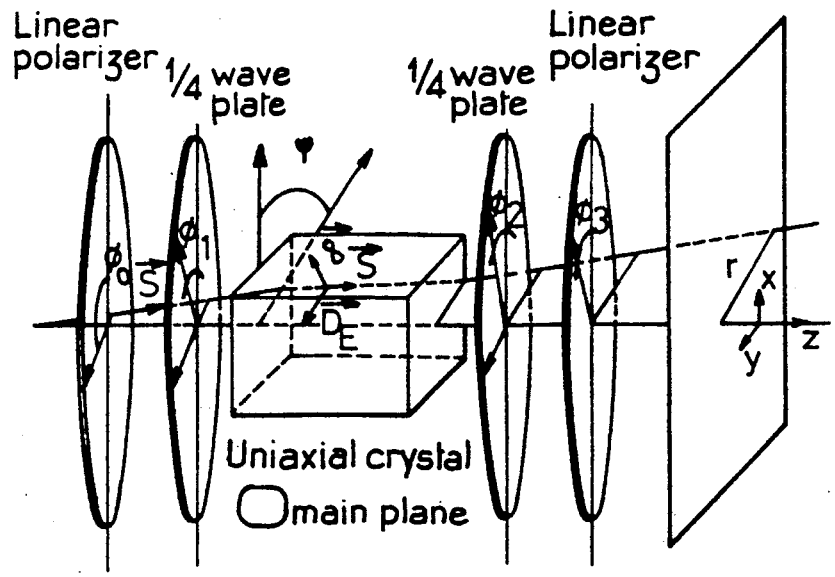
FIG_4
| $\alpha_1$ | $\alpha_2$ | T |
|---|---|---|
| $+\frac{\pi}{4}$ | $+\frac{\pi}{4}$ | $1 + \cos.\alpha r^2$ |
| $-\frac{\pi}{4}$ | $-\frac{\pi}{4}$ | |
| $+\frac{\pi}{4}$ | $-\frac{\pi}{4}$ | $1 - \cos.\alpha r^2$ |
| $-\frac{\pi}{4}$ | $+\frac{\pi}{4}$ | |
| 0 | $+\frac{\pi}{4}$ | $1 - \sin 2(\psi - \phi_0)\sin.\alpha r^2$ |
| 0 | $-\frac{\pi}{4}$ | $1 + \sin 2(\psi - \phi_0)\sin.\alpha r^2$ |

FIG_5
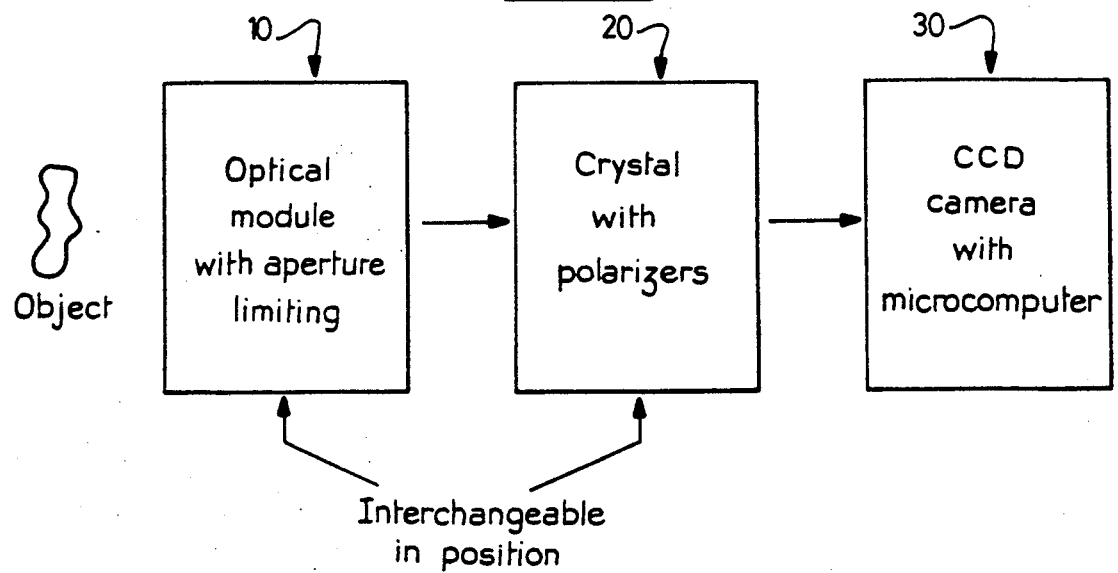
FIG_6a
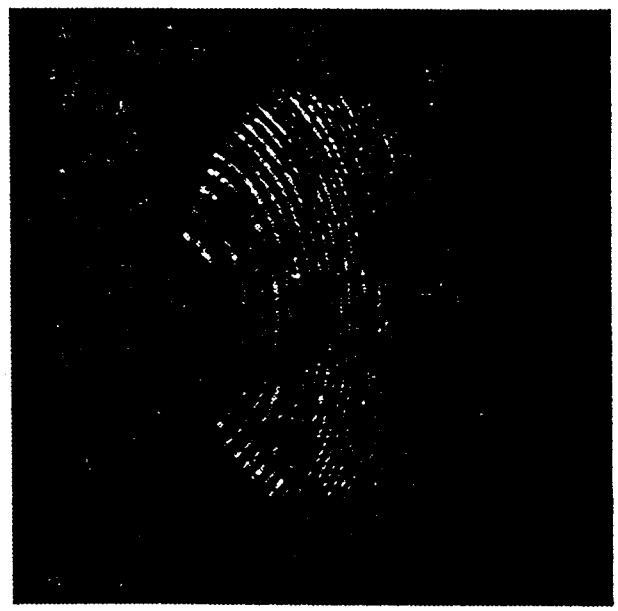

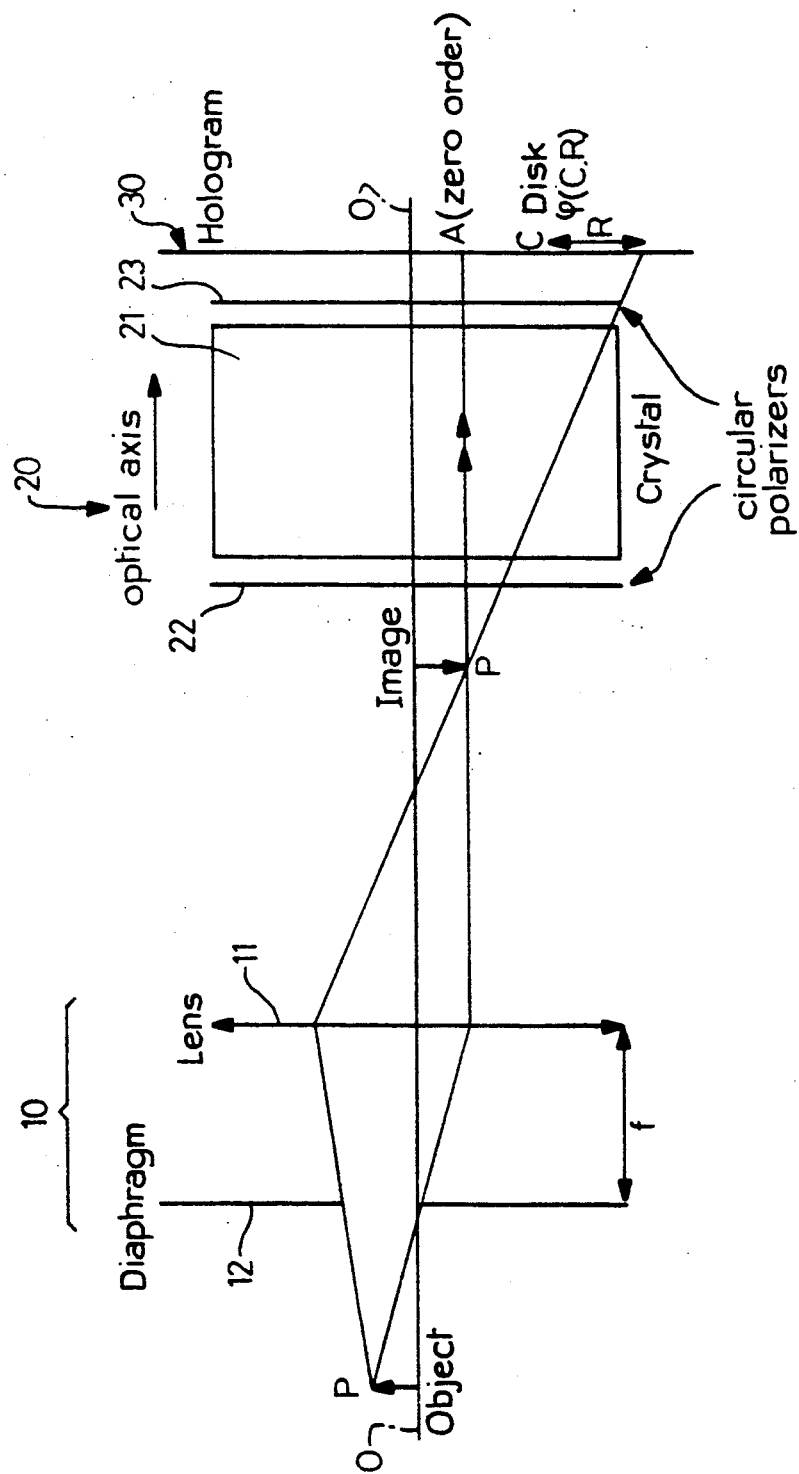
FIG_7

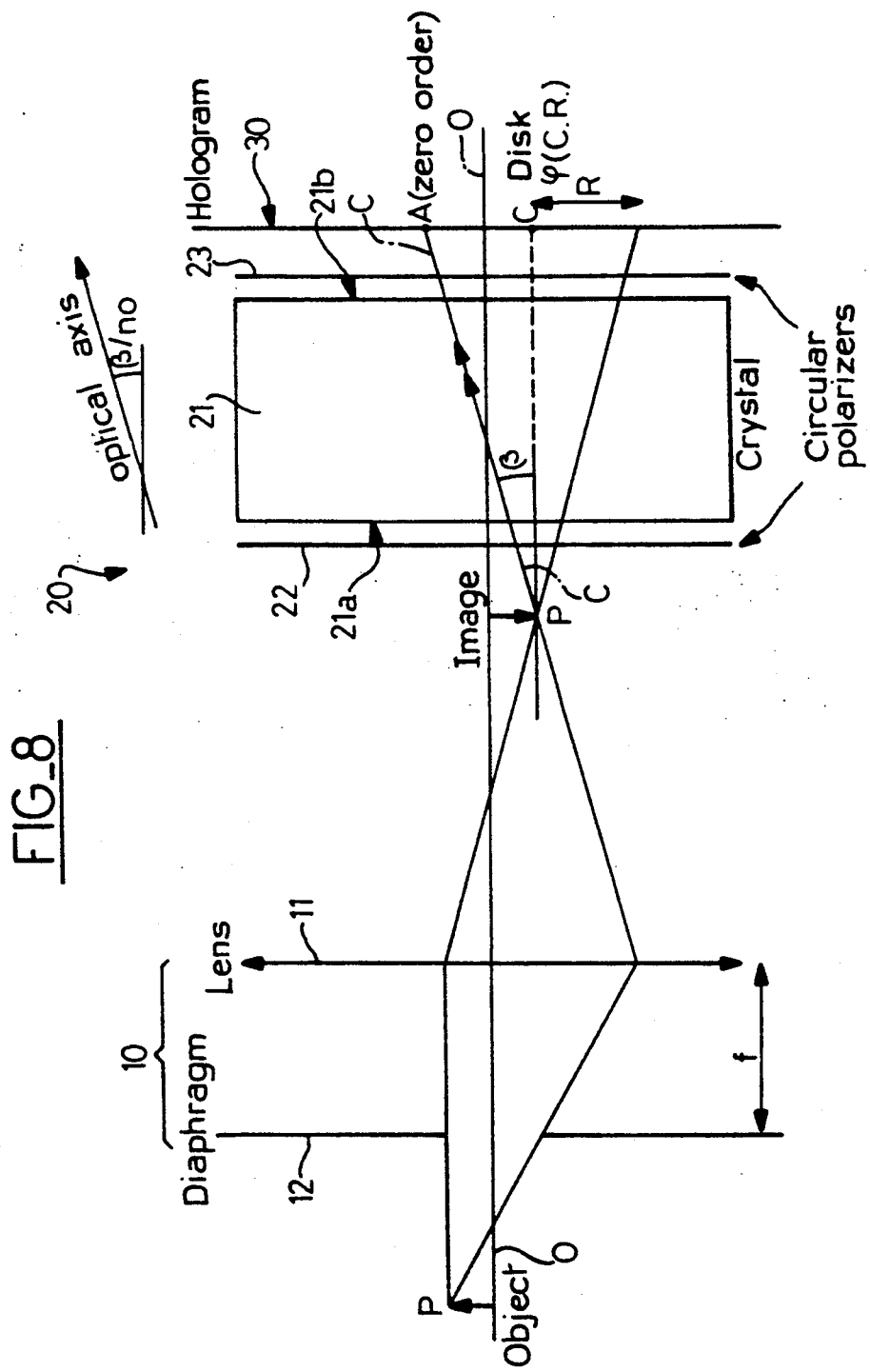

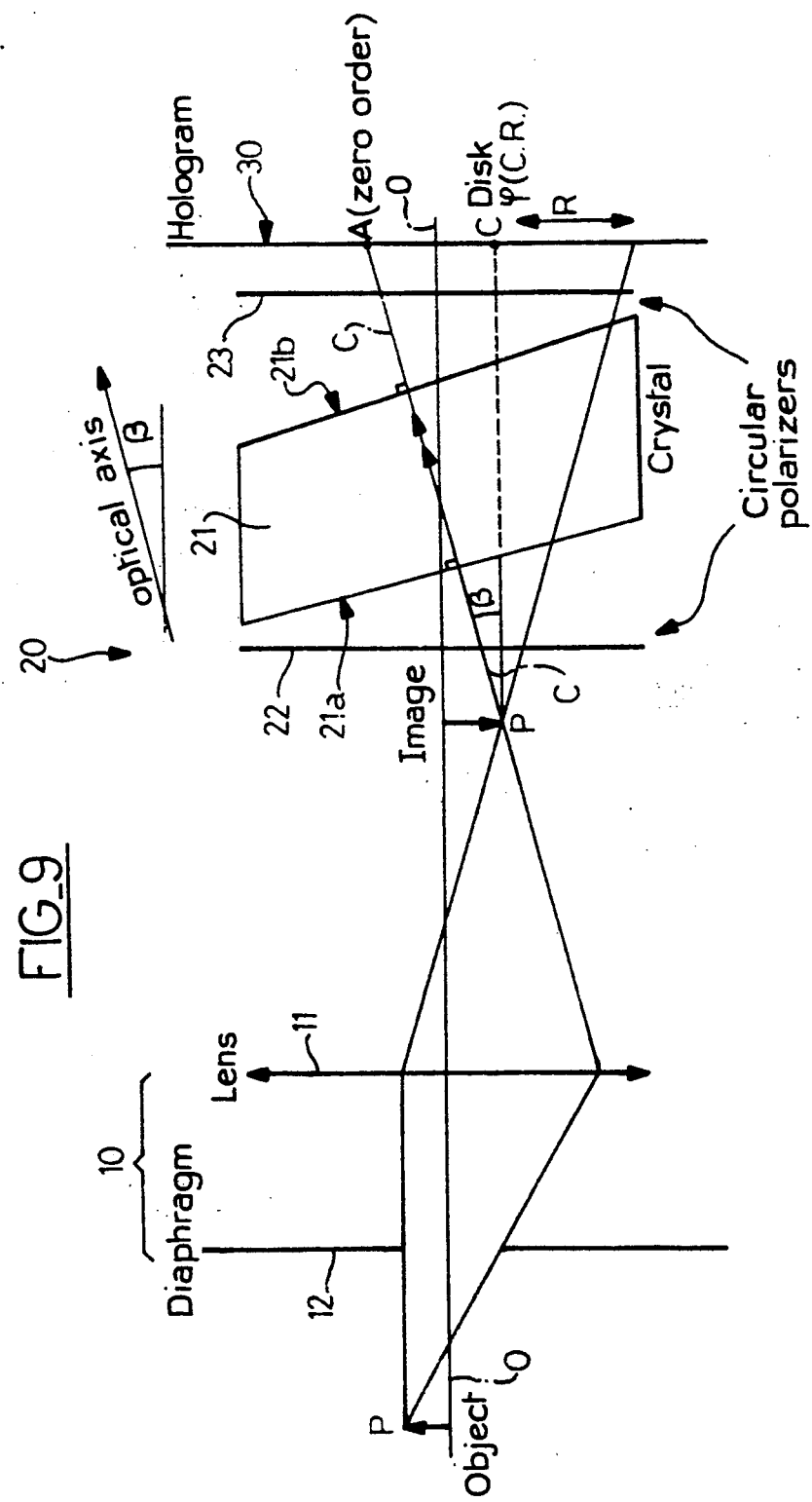
FIG_9

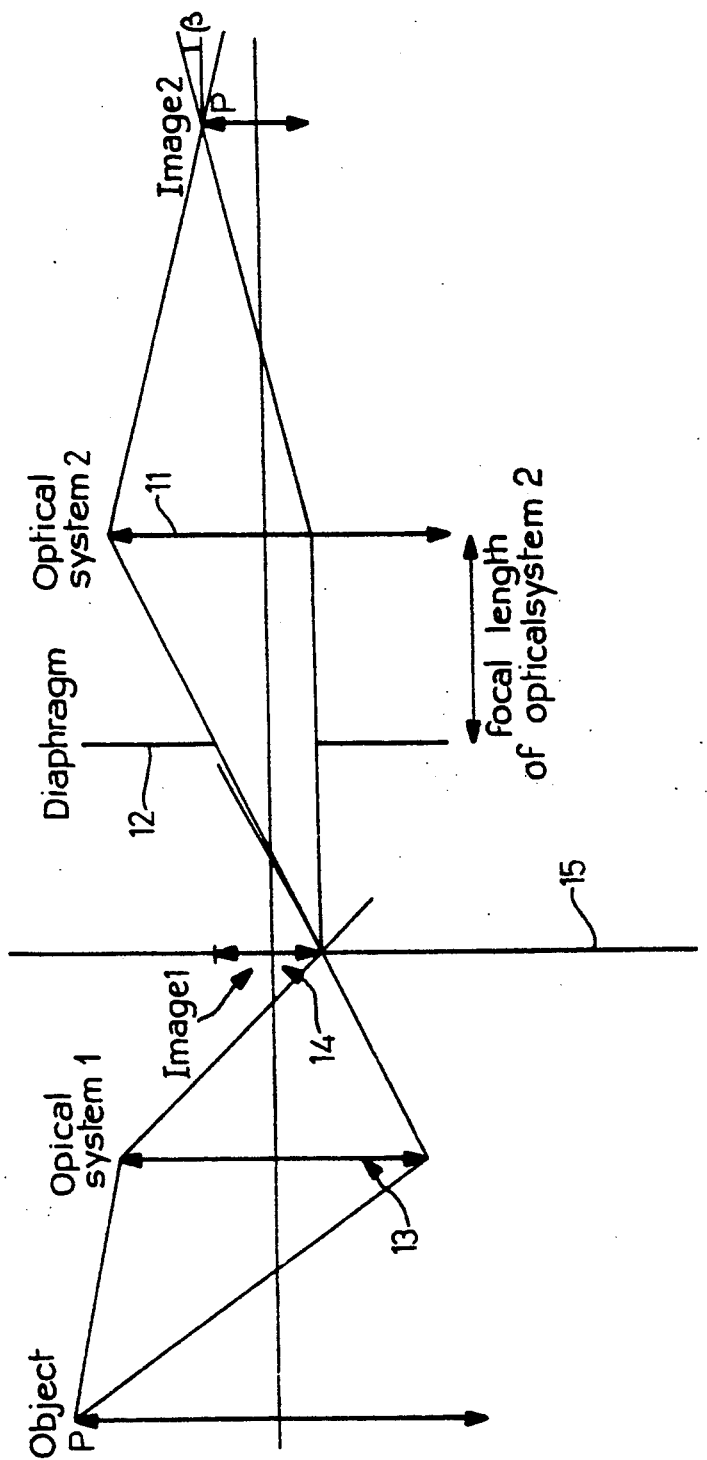

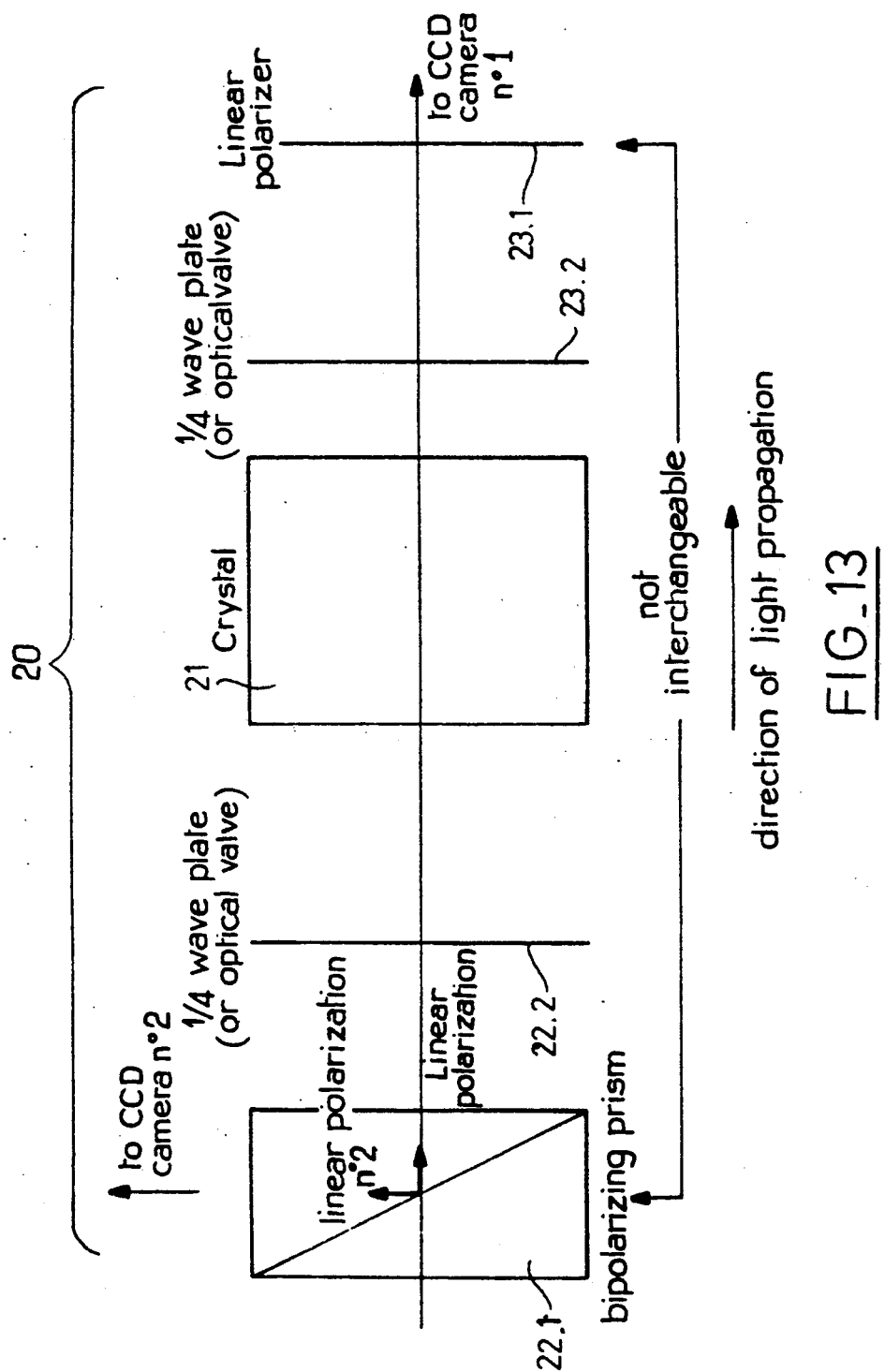

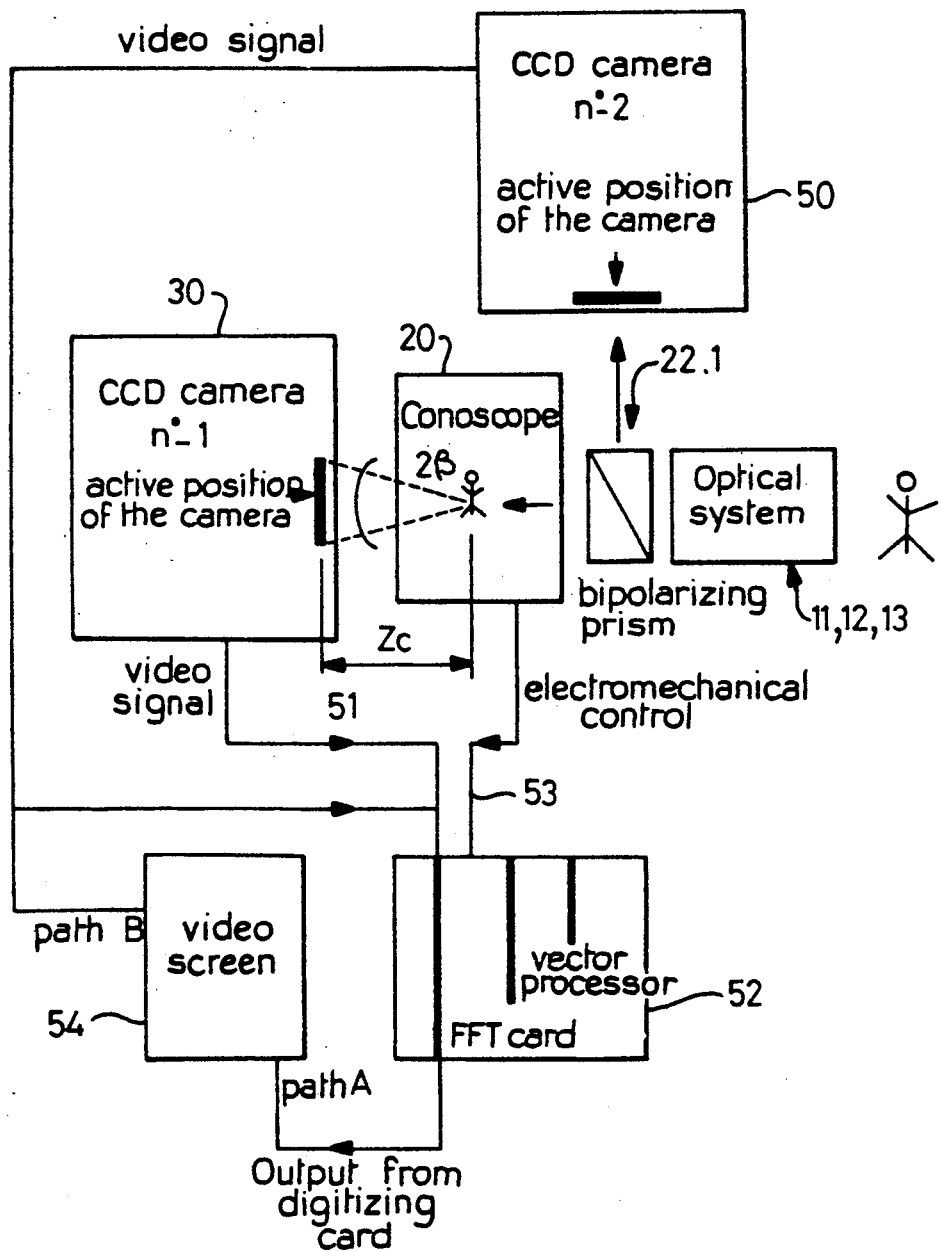
FIG_14

HOLOGRAPHIC APPARATUS USING INCOHERENT LIGHT

The present invention relates to holography.

It relates more particularly to holography performed using incoherent monochromatic light, commonly referred to as "conoscopic" holography by the person skilled in the art.

BACKGROUND OF THE INVENTION

Apparatus for obtaining a conoscopic holograph using incoherent light is described in patent document U.S. Pat. No. 4,602,844. The apparatus described in that document includes, as illustrated diagrammatically in accompanying FIG. 1, a birefrigent uniaxial crystal inserted between two circular polarizers, and a photosensitive element consituting a recording medium.

In Document U.S. Pat. No. 4 602 844, the axis of the crystal is parallel to the geometrical axis of the system, i.e. perpendicular to the recording medium.

The crystal decomposes an incident ray firstly into an ordinary ray subjected to a refractive index $n_o$, and secondly into an extraordinary ray subjected to a refractive index which varies as a function of the angle of incidence $\theta$, with this variable refractive index being written $n_e(\theta)$.

These two rays propagate at different speeds within the crystal. As a result they are at different phases on leaving the crystal. Conoscopic holography is based on the fact that this phase difference is a function of the angle of incidence $\theta$. The two rays interfere on the recording medium (photographic film, CCD, ...) after passing through the outlet polarizer such that the intensity of the resulting ray is also a function of the angle $\theta$. In other words, unlike conventional holography, each incident ray produces its own reference ray. The set of rays situated on a cone whose axis is parallel to the optical axis of the crystal and having an aperture angle $\theta$ will give the same intensity on the observation plane.

As shown in accompanying FIG. 2, the conoscopic hologram of a point obtained by means of the above-mentioned apparatus corresponds to a zoned grating whose transmittance varies sinusoidally as a function of the square of its distance from the center of the grating, i.e. a series of concentric angular interference fringes.

The conoscopic hologram of an object is the superposition of the holograms of each of the points constituting the object. FIGS. 3b and 3c of above-mentioned Document U.S. Pat. No. 4,602,844 respectively show the holograms for two points and for three points of a plane object.

The resulting hologram contains all of the useful information, such that it is possible to reconstruct the initial object in three dimensions.

The conoscopic system performs a linear transformation between the object and its hologram.

The intensity at a point Q of the elementary hologram of the point P is given by:

$$I_p(Q) = I(P)(1 + \cos\alpha(P)r^2) \quad (1)$$

where $\alpha(P)$, known as the Fresnel parameter, depends on the optico-geometric characteristics of the crystal, on the wavelength $\lambda$ of the light, and on the longitudinal distance $z(P)$ at which the point P is located relative to the recording plane.

The impulse response of the system, which characterizes the linear transformation, is written:

$$T(x', Y') = 1 + \cos(\alpha r^2) \quad (2)$$

where $r^2 = x'^2 + y'^2$, and:

$$T\alpha = 2\pi L \delta n / \lambda n_o^2 Z_c^2, \quad (3)$$

with
- $\lambda$ = source wavelength
- L = crystal wavelength along the optical axis
- $n_o$ = the ordinary index of the crystal
- $\delta n$ = the absolute value of the difference between the ordinary index and the extraordinary index
- x,y,z = coordinates in the object volume
- x',y' = coordinates in the hologram plane
- $Z_c$ = the corrected longitudinal coordinate of P and is given by:

$$Z_c = Z(x,y) - L + L/n_o \quad (4)$$

where Z(x,y) is the distance between the holographic plane and the object point under consideration, situated at the lateral position (x,y). The Fresnel parameter $\alpha$ can also be written:

$$\alpha = \pi / \lambda eq(Z_c) Z_c \quad (5)$$

thus defining an equivalent wavelength $\lambda eq$:

$$\lambda eq = \lambda n_o^2 Z_c / \delta n 2L \quad (6)$$

or:

$$\alpha = \pi / \lambda f_c \quad (7)$$

thus defining the focal length $f_c$ of the Fresnel lens:

$$f_c = n_0^2 Z_c^2 / \delta n \, 2L \quad (8)$$

When the object under consideration is plane ($\alpha$ = constant) the equivalent wavelength and the focal length $f_c$ are constants of the system.

Equation (5) then shows that the conoscopic hologram of a point recorded at a wavelength $\lambda$ is similar to the hologram of the same point recorded using coherent light (Gabor holography) at the equivalent wavelength $\lambda eq$. It should be observed that the conoscopic hologram measures intensities and not amplitudes.

Since the distances $Z_c$ and L are of the same order of magnitude, and since $\delta n$ is about 0.1, the wavelength $\lambda eq$ is greater than the real wavelength $\lambda$ at which recording takes place: typically $\lambda eq = 3$ µm to 100 µm.

As a result, the lateral resolution of the hologram (proportional to the wavelength $\lambda$) is less in conoscopic holography than in conventional holography. Its value lies around a few tens of micrometers.

As mentioned above, a hologram recorded using a conoscopic apparatus contains all of the useful information.

For example, for a hologram of a point corresponding to a zoned grating:
- the center of the zone and the object point lie on the same straight line parallel to the optical axis, and if the object point is translated transversely or laterally, then the hologram is translated identically in the holographic plane. The coordinates of the center $C(x_o, y_o)$ of the Fresnel zone are thus equal to the first two coordinates of the holographed point $P(x_o, y_o, z_o)$;
- the intensity of the hologram gives the light energy in the light aperture cone; and the spacing of the fringes gives the distance between the object and the observation plane, independently of the position of the conoscopic apparatus.

The following may be written:

$$Z_c = R^2/F\lambda eq \quad (9)$$

and $$Z(x,y) = Z_c + L - L/n_o = R^2/F\lambda eq + L - L/n_o \quad (10)$$

where R is the radius of the Fresnel zone and F is the number of light and dark fringes on the radius.

The advantages of the holographic method described above include the following:

there are no additional constraints due to space coherence of the light used for emitting the scene by a conventional standard optical system;

it is inherently stable (each elementary hologram follows the point with which it is associated), thus reducing hologram-taking conditions to those of ordinary photography and making it possible to operate in an industrial environment for moving objects; and the resolution required for recording is adaptable to CCD sensors making real-time digitizing possible and also enabling a plurality of images to be summed in order to improve the signal to noise ratio.

Since recording is linear, for an object having light-diffusing points lying on a three-dimensional surface S, the intensity at a point Q of the hologram will be the incoherent superposition of all of the elementary holograms of the points P constituting the object and can be written:

$$H(Q) = \int_s I_p(Q) dP \quad (11)$$

In the two-dimensional case, this integral reduces to a single convolution, and in the three-dimensional case to a series of convolutions.

Such holograms may be reconstituted either optically by encoding the digital information on a photolithographic plate and reading it back visually by means of a laser beam, or else numerically by applying appropriate deconvolution algorithms for obtaining the file z(x,y).

However, in spite of the great hopes based on conoscopic holography as described above, it has not yet led to industrial developments.

This appears to be due to the fact that it is relatively difficult to make use of a hologram made in this way.

In fact, a conoscopic hologram obtained using the means described in Document U.S. Pat. No. 4,602,844 contains two types of interfering information corresponding respectively to a coherent continuous background or "bias" representing non-diffracted light, and to a conjugate image, both of which degrade the basic information which is sufficient on its own for reconstructing the object.

These two types of interfering information which are superposed on the useful information when a conoscopic hologram is recorded can be shown up by illuminating the conoscopic hologram recorded on a photosensitive film by means of a monochromatic plane wave. Three diffractive beams are then observed: the first beam represents the wave transmitted directly through the film and corresponds to the bias; the second wave is a spherical wave diverging from a virtual object which is a replica of the original object; and the third wave is a spherical wave converging on a conjugate real image of the object situated symmetrically to the virtual image about the plane of the hologram.

The two above-mentioned interfering types of information (bias and conjugate image) can also be shown up by the following, more theoretical approach.

For plane objects, the linear transformation between the intensity I of x, y of the object and the intensity H(x', y') of the hologram is given by the convolution:

$$H(x',y') = I(x,y) * T(x,y) \quad (12)$$

After developing the convolution equation (12), the hologram appears at a Fresnel transform:

$$H(x',y') = I_o + I(x,y) * \cos(\alpha r^2) \quad (13)$$

or $$H(x',y') = I_o + \tfrac{1}{2}I(x,y) * e^{j\alpha r^2} + \tfrac{1}{2}I(x,y) * e^{-j\alpha r^2} \quad (14)$$

where $I_o$ represents the bias intensity which penetrates directly through the system and where $\tfrac{1}{2}I(x,y) * e^{-j\alpha r^2}$ represents the conjugate image.

As described in the document optics Communications Vol. 65, No. 4, Feb. 15, 1988, pp. 243-249, proposals have been made to overcome the bias and the conjugate image by inclining the optical axis of the birefringent crystal relative to the optical axis of the system. However, as described in that document, this configuration is incapable of restoring the object in full and it is accompanied by all or a portion of the spectrum being deteriorated. Since this configuration gives very mediocre results, it was quickly abandoned.

Another solution for eliminating the conjugate image and the bias is described in French patent application number 88 17225 filed Dec. 27, 1988. It is based on the linear combination of several holograms.

In the basic disposition described in above-outlined Document U.S. Pat. No. 4,602,844, the inlet and outlet circular polarizers are constituted by a rectilinear polarizer and a quarterwave plate which are integrally fixed together. The invention described in patent application FR-88 17225 proposes separating these two plates, thereby making it possible to impart any polarization to the transmitted wave. Accompanying FIG. 3 is a diagram of the resulting conoscopic element. The angles $\phi_0$, $\phi_1$, $\phi_3$ represent the positions of the main polarization axes of the various plates. If the optical impulse response is written T, the intensity at a point Q of the hologram of a point P is written:

$$I_p(Q) = I(P)T(P,Q) \quad (15)$$

The table of accompanying FIG. 4 shows the various expressions for the function T depending on the values of $\alpha_1 = \phi_0 - \phi_1$ and of $\alpha_2 = \phi_2 - \phi_3$. The angle $\psi$ and the distance r represent the polar coordinates of the point Q in a frame of reference based on the center of the zoned grid (orthogonal projection of P on the recording plane). The parameter $\alpha(P)$ is defined in the same way as in the basic configuration.

It can be seen that it is possible to use simple linear combinations of the transfer functions of the above table to obtain the following impulse responses:

$$T_c(P,Q) = \cos\alpha(P)r^2 \quad (16)$$

$$T\phi_o(P,Q) = \sin2(\psi - \phi_o) \sin\alpha(P)r^2 \quad (17)$$

of, using $\phi_o = 0$ and $\phi_o 32\ \pi/4$, respectively $$T_c(P,Q) = \cos\alpha(P)r^2 \quad (18)$$

$$T_o(P,Q) = \sin2\psi\sin\alpha(P)r^2 \quad (19)$$

$$T\pi/4(P,Q) = \cos 2\psi \sin\alpha(P)r^2 \quad (20)$$

By using linear combinations of these three functions in the Fourier plane, it is possible to obtain the complex impulse response:

$$T(P,Q) = \exp j\alpha(P)r^2 \quad (21)$$

exactly for a point or a plane object.

However, for a three-dimensional surface, this expression is no longer applicable and it can be considered as being valid only for the high frequencies of the hologam. Methods exist enabling the low frequencies to be restored, in particular by using a two-dimensional image of the scene as provided by another camera. Such methods are complex to implement and require the knowledge of a normalization factor between the image and the hologram, and this factor is difficult to determine.

Consequently, this type of holography is of practical use only for applications where low frequencies are not of interest, in particular system for identifying points (projecting an array of points) or for telemetry.

The object of the present invention is to provide new means for obtaining a complex hologram for an arbitrary three-dimensional surface merely by filtering in the Fourier plane.

As shown below, the present invention serves to eliminate the conjugate image without any correction depending on its longitudinal coordinate.

SUMMARY OF THE INVENTION

According to the present invention, the above-mentioned object is achieved by a holographic apparatus of the type comprising a conoscopic system including a birefringent crystal inserted between two polarizers, wherein the apparatus also includes an aperture angle limiter inserted on the path of the light rays, and wherein one of the birefringent crystal and the aperture angle limiter is disposed off the optical axis of the apparatus.

In a first embodiment of the present invention, the aperture angle limiter comprises a lense and a diaphragm whose margin lies flush with the axis of the lens, while the optical axis of the birefringent crystal lies parallel to the optical axis of the apparatus.

In a second embodiment of the present invention, the aperture angle limiter comprises a lens and a diaphragm centered on the optical axis of the apparatus, while the axis of the crystal is inclined relative to the optical axis of the apparatus.

In a third embodiment, the aperture angle limiter is an interference filter and the axis of the birefringent crystal is inclined relative to the optical axis of the apparatus.

In a fourth embodiment of the present invention, the aperture angle limiter is constituted by a two-prism system, while the axis of the birefringent crystal is inclined relative to the optical axis of the apparatus.

In a fifth embodiment of the present invention, the aperture angle limiter is constituted by a slab of fibers.

BRIEF DESCRIPTION OF THE DRAWINGS

Embodiments of the invention are described by way of example with reference to the accompanying drawings, in which:

FIG. 1 is described above and is a diagram showing the general structure of the apparatus mentioned in Document U.S. Pat. No. 4 602 844;

FIG. 2, as described above, shows the hologram for a point;

FIG. 3, as described above, is a diagram showing the structure of the apparatus disclosed in French patent application FR-88 17225, and FIG. 4 is a table showing various associated transfer functions;

FIG. 65 is a block diagram of the optical portion of a conoscope apparatus in accordance with the present invention;

FIG. 6a shows the elementary hologram of a point as obtained using the apparatus of the present invention;

FIG. 7 is a diagram for an aperture angle limiter using an off-axis diaphragm and an on-axis crystal;

FIGS. 8 and 9 show two variants of an aperture angle limiter having an on-axis diaphragm and an off-axis crystal;

FIG. 10 shows a configuration having two optical systems;

FIG. 13 shows a variant embodiment of the present invention for obtaining a two-dimensional image of the object in addition to the hologram; and FIG. 14 is an overall block diagram of apparatus in accordance with the present invention.

DETAILED DESCRIPTION

Figure 6B:
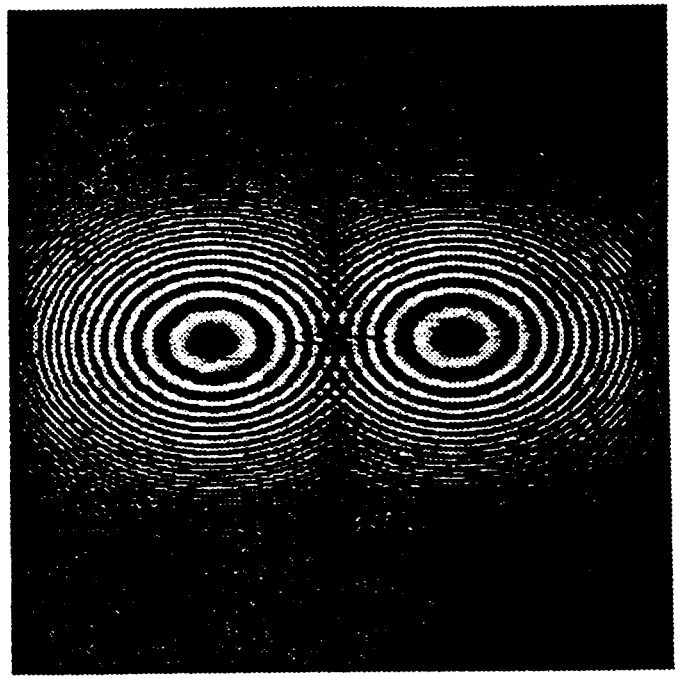
FIGS. 6b and 6c respectively show the real portion and the imaginary portion of the Fourier transform of the elementary hologram.

As shown in accompanying FIG. 5, apparatus of the present invention essentially comprises three modules: 1) an optical module 10 having an aperture angle limiter; 2) a conoscopic system 20 including a birefringent crystal placed between two polarizers; and 3) recording means 30 constituted, for example, by a CCD type camera associated with a microcomputer.

Naturally, the optical system 10 including the aperture angle limiter and the conoscopic system 20 should be disposed between the object and the recording means 30.

However, the order of the modules comprising the optical system 10 including the aperture angle limiter and the conscopic system 20 may be interchanged, i.e. the aperture angle limiter may be disposed either before or after the crystal.

Each of the inlet and outlet polarizers is constituted by a rectilinear polarizer associated with a quarterwave plate, or by means which are functionally equivalent.

One of the four plates constituting the two circular polarizers must be free to rotate so as to eliminate the term representing the non-diffracted light (bias) by digital hologram subtraction. This disposition is explained below.

The physical consequence of this dispositin is that for each point of the object, a zoned grating is produced having its center A located on the margin limiting the area of the elementary hologram as shown in FIG. 6a.

Assume that this limiting margin of each hologram is in the form of a circle $\phi$ of center C and radius R (a priori the shape of the margine could be arbitrary so long as the center of the zoned grating is not contained in the hologram). The intensity at a point Q of the elementary hologram associated with a point P, after subtracting the bias, is given by:

$$I_P(Q) = \phi(C,R)(Q)\cos\alpha(P)r^2 \quad (22)$$

where r is the polar coordinate of Q in a frame of reference related to A, and $\phi(C,R)(Q)$ is equal to one if Q belongs to $\phi$, and is otherwise equal to zero.

Figure 6C:
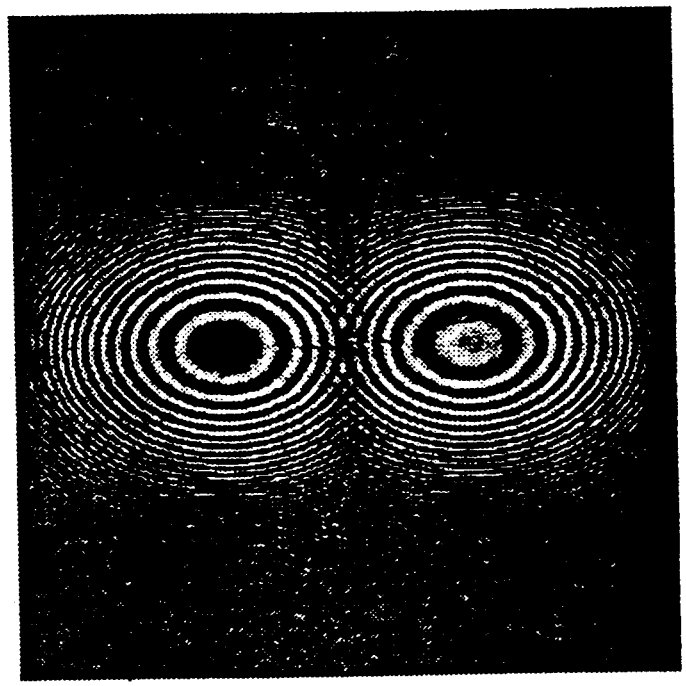

The real portion and the imaginary portion of the Fourier transform of this elementary hologram are shown in accompanying FIGS. 6b and 6c respectively.

Since the impulse response is no longer symmetrical, its Fourier transform is no longer real and is constituted by a complex exponential.

FIG. 7 shows the structure of a conoscopic apparatus of the present invention comprising an off-axis aperture angle limiter and an on-axis crystal.

In FIG. 7, the optical axis of the system is referenced O—O.

FIG. 7 shows the conoscopic system 20 comprising a birefringent crystal 21 placed between two circular polarizers 22 and 23. The axis of the crystal 21 is parallel to the optical axis O—O of the system.

FIG. 7 also shows a recording medium extending transversely to the axis O—O and shown diagrammatically.

In FIg. 7, the off-axis aperture angle limiter 10 comprises a lens 11 and a diaphragm 12. The lens 11 is centered on the axis O—O. The margine of the diaphragm 12 lies flush with the optical axis O—O of the lens. The diaphragm 12 is placed in the object focal plane of the lens 11.

Returing to expression 22, it can be seen that in this case the point A (center of the zoned grating) coincides with the orthogonal projection of the point P.

FIGS. 8 and 9 are diagrams showing two variant embodiments of the conoscopic apparatus of the present invention having an on-axis aperture angle limiter and an off-axis crystal, i.e. a crystal whose is inclined at an angle $\beta$ relative to the optical axis O—O of the system.

FIG. 8 and 9 show a conoscopic system 20 including a birefringent crystal 21 placed between two circular polarizers 22 and 23 and a recording medium 30.

The optical axis of the crystal 21 is referenced C—C in FIGS. 8 and 9.

The recording medium 30 is perpendicular to the axis O—O.

More precisely, in FIG. 8, the inlet and outlet faces 21a and 21b of the crystal 21 are perpendicular to the optical axis O—O of the system whereas they are perpendicular to the optical axis C—C of the crystal in FIG. 9.

In FIGS. 8 and 9 the aperture angle limiter 10 is still constituted by a diaphragm 12 and by a lens 11. These two are centered on the optical axis O—O of the system. The diaphragm 12 is placed in the optical focal plane of the lens 11.

In this case, it is the point C, i.e. the center of the circle delimiting the elementary hologram, that coincides with the orthogonal projection of P on the recording plane 30.

The half angle at the apex of the aperture cone attributed to each point is given by the angle limiter and it should coincide with the axis of inclination of the crystal.

The systems described with reference to FIG. 7, 8, and 9 serve to limit the aperture angle in a manner which is spacially infariant. It is this feature which is essential for the off-axis configuration to be usable in practice. However, in previous solutions, it is necessary for the three-dimensional extent of the object to be smaller than a given value so that the aperture angle limiter is capable of operating correctly for all of the points of the object. If the diameter of the diaphragm is written O, the diameter of the lens is written D, and the three-dimensional extent of the object is written E, then the following relationship must be satisfied:

$$E < (dR/f) - O(1 + d/f) \quad (23)$$

where f is the focal length of the lens and d is the distance of the object from the diaphragm. In addition, the aperture $\beta$ is independent of d:

$$\tan\beta = O/2f \quad (24)$$

It therefore suffices to use a different optical system for imaging the screen in such a manner as to reduce its dimensions. However, if E tends towards zero, then the image of the scene must be far enough away from the diaphragm at the distance d for:

$$d > f O/(R - O) \quad (25)$$

In addition, if this configuration having two optical systems is used, it is also possible to reduce the extend E of the scene by means of a second diaphragm placed at the location where the image of the object is focused so as to be able to select a zone from the object A diagram of configuration having two optical systems is shown in FIG. 10. The position of the crystal is not specified in this figure since it may be placed anywhere in front of the object being holographed.

FIG. 10 shows a first optical system 13 giving a reduced image 14 of the object, followed by the diaphragm 12 and the lens 11 giving the desired image. The diaphragm 12 is placed in the object focal plane of the lens 11. Reference 15 designates a second diaphragm situated in the image plane 14 for the purpose of selecting a zone thereof, if necessary.

For the aperture angle limiter constituted by a diaphragm 12 in the object focal plane of a lens 11, the shape of the diaphragm 12 and its transparency may be chosen in order to select certain frequencies in the hologram so as to match this filter to an object having a given spectrum distribution (in terms of spatial frequencies), and this may be of great utility in pattern recognition.

To give a simple example, a square diaphragm shape is more suitable for restoring the vertical frequencies of the holographed object than is a circular shape (assuming that the zoned grating center is offset horizontally). Further, if it is desired to restore the high frequencies of the object preferentially, then it would be possible to use a diaphragm whose transmittance is 0.5 at low frequencies in the elementary hologram and 1 at high frequencies, with the variation law between these two values being chosen arbitrarily.

The above-mentioned lens and diaphragm aperture angle limiter may be replaced by other, functionally equivalent means which are independent from the optical system serving to image the scene and which cooperate with an off-axis crystal.

In a first variant, the lens and diaphragm aperture angle limiter may be replaced by an interference filter.

Figure 11:
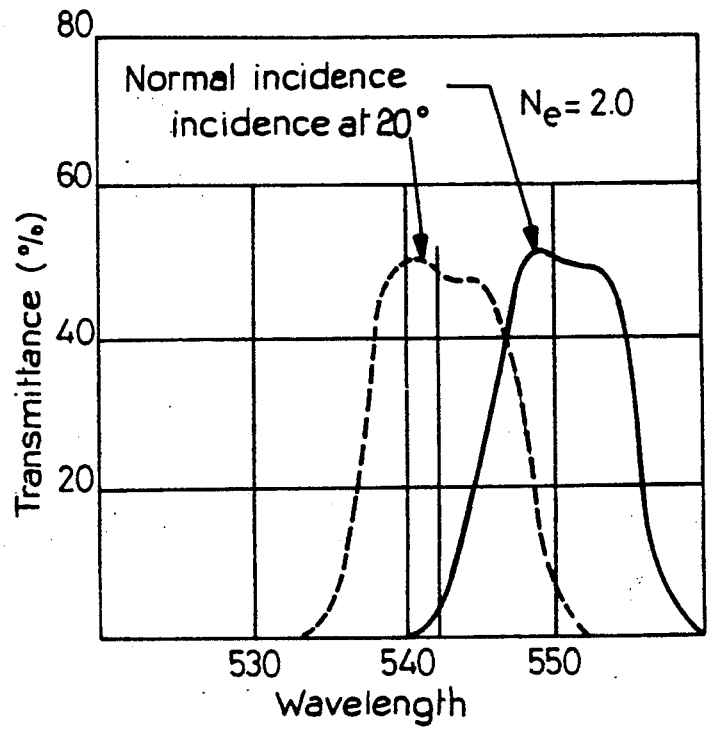
FIG. 11 shows the passband of an interference filter.

Consider an interference filter having its passband centered on the wavelength $\lambda_0$, but illuminated by a wave of wavelength $\lambda_1$ propagating at an angle $\alpha$ relative to the normal. The interference filter will be centered on the wavelength $/\alpha$ such that:

$$\lambda_\alpha = \lambda 0 \sqrt{1 - (\sin^2\alpha/N^{*2})} \qquad (26)$$

where $N^*$ is the effective refractive index of the filter. FIG. 11 shows the shift in resonance wavelength of the filter for an angle $\alpha$ of 20°. It can be seen that regardless of the sign of $\alpha$, $\lambda_\alpha$ is always less than $\lambda_0$. Assume that it is desired to eliminate a given angle $\alpha_0$. Then:

$$\tfrac{1}{2}\delta\lambda + \lambda\alpha 0 = \lambda 1 \qquad (27)$$

where $$\lambda 0 - \tfrac{1}{2}\delta\lambda < \lambda 1 < \lambda 0 + \tfrac{1}{2}\delta\lambda \qquad (28)$$

Equations (27) and (28) give the wavelength $\lambda_l$ at which the filter should be used in order to eliminate all angles below $\alpha_0$ for fixed $\delta\lambda$ and $\lambda$.

In a second variant, the lens and diaphragm aperture angle limiter may be replaced by a two-prism system.

Figure 12:
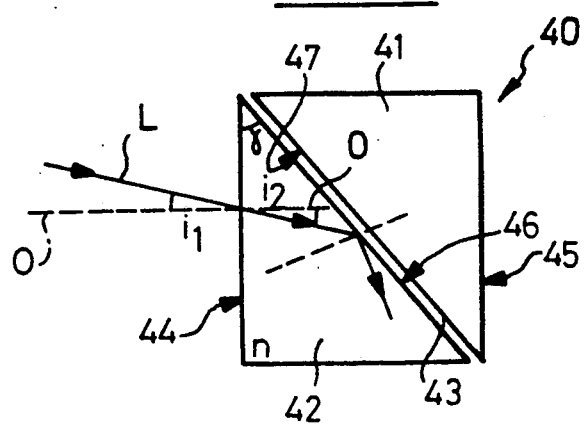
FIG. 12 is a diagram showing a variant aperture angle limiter using prisms.

As shown in FIG. 12, this system may be constituted by a glass cube 40 of index n split into two identical portions 41 and 42 by a layer of lower index 43 (e.g. air).

In FIG. 12, the optical axis of the system is referenced O—O and the incident light ray at an angle $i_1$ relative to the optical axis O—O is referenced L.

The axis O—O and the ray L define a plane orthogonal to the inlet face 44 and the outlet face 45 of the system 40.

In addition, the plane defined by the axis O—O and the ray L is also orthogonal to the facing inside faces 46 and 47 of the prisms 41 and 42 which are parallel to each other and which delimit the said low index layer 43. The faces 46 and 47 are themselves inclined at an angle $\gamma$ relative to the inlet face 44 and the outlet face 45.

Consider a ray L at an angle $i_1$ to the axis O—O. The angle $\gamma$ of the layer 43 may be such that total internal reflection occurs for small $i_1 = \alpha_0$, as given by the equation: $(29) \gamma = \text{Arcsin}(1/n) - (\alpha_0/n)$ The maximum angle $i_1$ eliminated by the system 40 preferably coincides with the angle of inclination of the axis of the crystal 21.

The two-prism system 40 can eliminate angles greater than a given value in one direction only. If it is desired to eliminate angles in the other three directions (opposite sign and in orthogonal directions), three other identical elements should be added in suitable positions. However, this is not a necessary condition since the real image and the conjugate image can be separated adequately using a single element.

Whether or not the other three possible elements are added will depend on the signal-to-noise ratio.

In a third variant, the lens and diaphragm aperture angle limiter may be replaced by a fiber slab assembly.

Fiber slabs are current used in CCD cameras as image intensifiers. They may also be used as aperture angle limiters.

These elements are constituted by fibers having very fine cores (about 4 microns to 6 microns in diameter) surrounded by intersticial glass that is slightly absorbent oprically. Image degradation is low so long as the density of fibers per elementary cell in the CCD plate is 25 to 30. Transmittance along the axis of such a slab is typically 80% to 90%. Depending on the refractive indices of their cores and their cladding, the fibers will have a given numerical aperture and will therefore eliminate all angles beyond a certain value.

It has been mentioned above that the non-diffracted light (bias) can be eliminated by subtracting holograms.

Regardless of the configuration concerned, bias may be eliminated by taking two holograms and subtracting one from the other. The first hologram corresponds to the case where the inlet and outlet polarizers 22 and 23 are both circular and in the same direction (right or left). The second hologram corresponds to the case where the inlet and outlet polarizers 22 and 23 are both circular but in opposite directions (if one of them is circular to the right, then the other must be circular to the left).

To do this, it suffices for one of the four plates constituting the polarizers 22 and 23 to be capable of being rotated independently, and for said plate to be rotated through 90° in order to switch from one case to the other The system of the present invention is preferably additionally provided with means for obtaining a two-dimensional image of the object at the same time as the hologram is obtained.

This can be done merely by replacing the linear inlet polarizer by a bipolarizing prism 22.1 so as to direct the other polarization towards a second recording medium 50, such as a camera (which other polarization corresponds to that half of the light which would otherwise merely be wasted if a single linear polarizer were used). This provides improved interactiveness and facilitates using the hologram, in particular when processing images. In this case, it is therefore necessary to release one of the three remaining plates so that it can be rotated, so as to obtain the two holograms required for eliminating the bias.

A diagram of this solution is shown in FIG. 13.

FIG. 13 shows a conoscopic system 20 including a crystal 21, a circular inlet polarizer 22 and a circular outlet polarizer 23.

The circular inlet polarizer 22 is constituted by a bipolarizing prism 22.1 and by a quarterwave plate or an equivalent optical valve 22.2.

The circular outlet polarizer 23 is constituted by a quarterwave plate or an equivalent optical valve 23.2 and by a linear polarizer 23.1.

It may be observed that the bipolarizing prism 22.1 and the linear outlet polarizer 23.1 are not interchangeable. The bipolarizing prism 22.1 must be provided at the upstream end relative to the direction of light propagation.

It should be observed that any element capable of rotating polarization through 90° may be interposed in the space delimited by the two linear polarizers 22.1 and 23.1. In particular, one of the two quarterwave plates 22.2 and 23.2 may be replaced by an optical valve. By controlling its voltage, it would then be easy the change righthand circular polarization into lefthand circular polarization, and vice versa.

The limited aperture conoscopic apparatus of the present invention makes it easy to eliminate the conjugate image and to obtain a complex impulse response regardless of the longitudinal position of the point: once the hologram has been recorded in this configuration, regardless of whether the hologram is of a plane object or of a three-dimensional surface, it suffices to retain only half of the spectrum in order to obtain the complex hologram of the object.

The resulting digital processing is thus very simple since it consists in eliminating half of the spectrum.

A particular embodiment of apparatus in accordance with the present invention is described by way of non-limiting example.

In this embodiment, the apparatus comprises a CCD camera 30 whose photosensitive matrix possesses 512×512 pixels each having a size of 15×15 microns, giving a total area of 8×8 millimeters, an off-axis crystal 21 with faces parallel to the recording medium 30 preceded by two on-axis optical systems serving both to adjust the three-dimensional extent of the scene to be holographed by means of a first diaphragm and to limit the aperture angle by means of a second diaphragm 12. The three-dimensional extent of the scene and the zoned grating are chosen to constitute one-half of the three-dimensional extent of the medium.

The radius of the zoned grid is given by: (30) $R = \frac{1}{2}Nd$ where $N = 512$ and is the total number of pixels in one direction.

The number of light and dark fringes over a distance 2R relative to the zero order of the zoned grating is given by:

$$F = 4\alpha R^2/\pi \quad (31)$$

and the maximum frequency is given by:

$$\epsilon_{max} = (1/2\pi) 2\alpha 2R = 2\alpha R/\pi \quad (32)$$

The digitizing pixel size corresponding to the Nyquist frequency is thus such that:

$$d = 1/2\epsilon_{max} = \pi/4\alpha R \quad (33)$$

Equations (30), (31) and (33) then give: $F = \frac{1}{4}N = 128$.

Further, the equation relating F and $\beta = R/Z_c$ can be written $F = 4(2L\delta n/\lambda n_0^2)\beta^2$.

Considering a crystal of calcite such that: $n_0 = 1.658$, $\delta n = 0.172$, and $L = 20$ mm, the required aperture is $\beta = 0.1$ radians.

The angle of inclination of the crystal is given by:

$$\theta = \beta/n_0 = 0.06 \text{ radians}$$

and the distance z between the object and the CCD plate is given by:

$$Z_c = R/\beta = 20 \text{ mm i.e.}$$

$$Z = Z_c + L(n_0 - 1)/n_0 = 27 \text{ mm}$$

The diameter $0_1$ of the first diaphragm, assuming that the image of the object is at a distance f from the second diaphragm (where f is the object focal length of the second optical system) so as to give a magnification of $-1$ or of $+1$, is given by:

$$0_1 = 2R = 4 \text{ mm}$$

and the diameter $0_2$ of the second diaphragm, assuming that the object focal length f of the second optical system is 50 mm, is given by:

$$0_2 = 2\beta f = 10 \text{ mm}$$

There follows a description of the overall structure of a conoscopic apparatus in accordance with the present invention suitable for directly acquiring holograms in the memory of a microcomputer together with the corresponding two-dimensional images. A block diagram of the apparatus is given in FIG. 14.

The scene or object to be holographed is illuminated by a monochromatic lamp and is imaged by the above-described conoscopic configuration 11, 12, 13 having two optical systems and an aperture angle $\beta$.

After passing through the optical system 11, 12, 13 the light is decomposed by means of the above-mentioned bipolarizing prism 22.1 into two polarizations which are directed towards two different cameras 30 and 50.

The first image corresponding to one of the polarizations is focused after passing through the conoscopic element 20 constituted by the off-axis crystal 21 and the polarizing plates 22.2, 23.1, and 23.2 at a distance z from the CCD plate 30 of the first camera. This first video signal is transmitted by a link 51 to a digitizing card installed in a microcomputer 52 which resamples it and encodes it on 8 bits.

The second image corresponding to the second polarization is focused on the CCD plate of the second camera 50 and is digitized and stored in the same manner.

After these two operations, the microcomputer 52 which is fitted with signal processing cards and with an arithmetic coprocessor contains information in its memory relating to intensity and to depth as required for performing digital reconstructions in real time (using Fourier transforms, inter alia).

As mentioned above, the optical polarization axis of one of the three remaining plates may be rotated either mechanically or electrically. The mechanical solution has the advantage of being able to make use of optical components of very high quality. The electrical solution is easier to implement since there is no problem of mechanical guidance in rotation and the time required to switch between righthand circular and lefthand circular is shorter.

In FIG. 14, the polarization axis is rotated under the control of the computer 52 via a link 53. The computer 52 is also connected to a video screen 54.

The present invention may be used in numerous applications.

A first, easily-implemented application is telemetry. It consists in evaluating the distance to an object aimed at by means of a laser beam so as to record the hologram of a point.

A second application consists in measuring deformations relative to a previously given reference recorded and stored digitally in the microcomputer. Such deformations may be millimetric or micrometric (depending on the optical systems used).

A third application lies in three-diemsional acquisition of objects, with reconstruction being optical or digital.

Naturally, the present invention is not limited to the particular embodiments described above, but it extends to any variant lying within its scope.

The aperture angle limiter as used in the invention for limiting aperture angle isotropically, i.e. regardless of the position of the object point, should not be confused with a conventional aperture limiter, e.g. the diaphragm of a camera, placed in the image focal plane of the object and which generates a cone of light that varies as a function of the point under consideration.

We claim:

1. A holographic apparatus of the type comprising a conoscopic system including a birefringent crystal inserted between two polarizers, wherein the apparatus also includes an aperture angle limiter inserted on the path of the light rays and wherein the aperture angle limiter is situated off the optical axis of the apparatus and the birefringent crystal is placed on the optical axis of the apparatus.

2. A holographic apparatus of the type comprising a conoscopic system including a birefringent crystal inserted between two polarizers, wherein the apparatus also includes an aperture angle limiter inserted on the path of the light rays and wherein the aperture angle limiter is centered on the optical axis of the apparatus, whereas the birefringent crystal has its axis inclined relative to the optical axis of the apparatus.

3. Apparatus according to claim 2, wherein the half angle at the apex of the aperture cone given by the limiter coincides with the inclination of the crystal relative to the optical axis of the apparatus.

4. Apparatus according to claim 2, wherein the aperture limiter includes an interference filter.

5. Apparatus according to claim 4, wherein the wavelength 1 at which the interference filter should be approached in order to eliminate a given angle 0 is given by the following equations:

$$1/2\delta\lambda + \lambda_{a0} = \lambda_1$$

$$\lambda_o - 1/2\delta\lambda < \lambda_1 < \lambda_0 + 1/2\delta\lambda$$

in which:
$\delta\lambda$ represents the passband of the filter centered on the wavelength $\lambda 0$
$\lambda a0$ represents the resonance wavelength of the filter for the angle given that $$\lambda a = \lambda 0 \sqrt{1 - [\sin^2\alpha]/N^{*2}} \text{ and}$$

N is the effective refractive index of the filter.

6. Apparatus according to claim 2, wherein the aperture angle limiter comprises a two-prism system.

7. Apparatus according to claim 6, wherein the two-prism system is constituted by a glass cube split into two identical portions separated by a layer of air.

8. Apparatus according to claim 6, wherein each of the prisms has an inlet face or an outlet face orthogonal to the plane defined by a ray and the optical axis of the system, and a working face orthogonal to said plane but inclined at an angle relative to said inlet or outlet face.

9. Apparatus according to claim 8, wherein the inclination of the working face relative to the inlet face or the outlet face is defined by the equation:

$$Y = \text{Arcisin } [1/n] - i_1/n$$

in which
n represents the index of the prisms; and
$i_1$ represents the inclination of the incident ray relative to the optical axis of the apparatus.

10. Apparatus according to claim 6, wherein the maximum angle to be eliminated coincides with the angle of inclination of the crystal axis relative to the optical axis of the apparatus.

11. Apparatus according to claim 6, comprising a plurality of two-prism systems distributed around the optical axis of the apparatus.

12. Apparatus according to claim 2, wherein the aperture angle limiter comprises a slab of fibers.

13. A holographic apparatus of the type comprising a conoscopic system including a birefringent crystal inserted between two polarizers, wherein the apparatus also includes an aperture angle limiter comprising a lens associated with a diaphragm, inserted on the path of the light rays and wherein one of the birefringent crystal and the aperture angle limiter is disposed off the optical axis of the apparatus.

14. Apparatus according to claim 13, wherein the diaphragm is placed in the object plane of the lens.

15. Apparatus according to claim 13, wherein the aperture angle limiter is situated off the optical axis of the apparatus and the birefringent crystal is placed on the optical axis of the apparatus, and wherein the lens is centered on the optical axis of the apparatus and that the diaphragm is flush with the axis of the lens.

16. Apparatus according to claim 13, wherein the aperture angle limter is centered on the optical axis of the apparatus, whereas the birefringent crystal has its axis inclined relative to the optical axis of the apparatus, and wherein the lens and the diaphragm are centered on the optical axis of the apparatus.

17. Apparatus according to claim 16, wherein the main inlet and outlet faces of the crystal are perpendicular to the optical axis of the apparatus.

18. Apparatus according to claim 16, wherein the main inlet and outlet faces of the crystal are perpendicular to the optical axis of the crystal.

19. Apparatus according to claim 13, wherein the diaphragm is circular in section.

20. Apparatus according to claim 13, wherein the diaphragm is square in section.

21. Apparatus according to claim 13, wherein the transmittance of the diaphragm is variable as a function of the frequency under consideration.

22. Apparatus according to claim 13, including optical means such that the three dimensional extent E of the object seen through the aperture angle limiter satisfies the relationship:

$$E < [dR/f] - 0[1 + d/f]$$

in which:
d represents the distance of the object from the diaphragm;
R represents the radius of an elementary hologram;
f representes the focal length of the lens; and 0 represents the dimeter of the diaphragm.

23. Apparatus according to claim 22, wherein the distance d of the object from the diaphragm satisfies the relationship:

$$d > f0/[R-0].$$

24. Apparatus according to claim 22, wherein the optical means include a second lens placed upstream from the aperture angle limiter.

25. Apparatus according to claim 22, including a diaphragm in the object plane.

26. A holographic apparatus of the type comprising a conoscopic system including a birefrigent crystal inserted between two polarizers, wherein the apparatus also includes an aperture angle limiter inserted on the path of the light rays, wherein the aperture angle limiter is centered on the optical axis of the apparatus, whereas the birefrigent crystal has its axis inclined relative to the optical axis of the apparatus, and wherein the half-angle at the apex of the aperture cone given by the limiter coincides with the inclination of the crystal relative to the optical axis of the apparatus.

27. A holographic apparatus of the type comprising a conoscopic system including a birefrigent crystal inserted between two polarizers, wherein the apparatus also includes an aperture angle limiter including an interference filter, inserted on the path of the light rays, and wherein the aperture angle limter is centered on the light rays, and wherein the aperture angle limiter is centered on the optical axis of the apparatus, whereas the birefringent crystal has its axis inclined relative to the optical axis of the apparatus.

28. Apparatus according to claim 27, wherein the wavelength 1 at which the interference filter should be approached in order to eliminate a given angle o is given by the following equations:

$$1/2\delta\lambda + \lambda_{ao} = 1$$

$$\lambda_o - 1/2\alpha\lambda < \lambda_1 < \lambda_o + 1/2\delta\lambda$$

in which:

$\delta \lambda$ represents the passband of the filter centered on the wavelength $\lambda$ o $\lambda \alpha 0$ represents the resonance wavelength of the filter for the angle $\alpha$ o given that $$\lambda\alpha = \lambda 0 \sqrt{1 - [\sin^2\alpha]/N^{*2}} \text{ and}$$

N is the effective refractive index of the filter.

29. A holographic apparatus of the type comprising a conoscopic system including a birefringent crystal inserted between two polarizers, wherein the apparatus also includes an aperture angle limiter comprising a two-prism system, inserted on the path of the light rays and wherein the aperture angle limiter is centered on the optical axis of the apparatus, whereas the birefringent crystal has its axis inclined relative to the optical axis of the apparatus.

30. Apparatus according to claim 29, wherein the two-prism system is constituted by a glass cube split into two identical portions separated by a layer of air.

31. Apparatus according to claim 29, wherein each of the prisms has an inlet face or an outlet face orthogonal to the plane defined by a ray and the optical axis of the system, and a working face orthogonal to said plane but inclined at an angle relative to said inlet or outlet face.

32. Apparatus according to claim 31, wherein the inclination of the working face relative to the inlet face or the outlet face is defined by the equation:

$Y = \text{Arcsin} [1/n] - i_1/n$ in which n represents the index of the prisms; and $i_l$ represents the inclination of the incident ray relative to the optical axis of the apparatus.

33. Apparatus according to claim 29, wherein the maximum angle to be eliminated coincides with the angle of inclination of the crystal axis relative to the optical axis of the apparatus.

34. Apparatus according to claim 29, comprising a plurality of two-prism systems distribution around the optical axis of the apparatus.

35. A holographic apparatus of the type comprising a conoscopic system including a birefringent crystal inserted between tow polarizers, wherein the apparatus also includes an aperture angle limiter comprising a slab of fibers, inserted on the path of the light rays and wherein the aperture angle limiter is centered on the optical axis of the apparatus, whereas the birefringent crystal has its axis inclined relative to the optical axis of the apparatus.

36. A holographic apparatus of the type comprising a conoscopic system including a birefringent crystal inserted between two polarizers, wherein the apparatus also includes an aperture angle limiter inserted on the path of the light rays, wherein the aperture angle limiter is centered on the optical axis of the apparatus, whereas the birefringent crystal has its axis inclined relative to the optical axis of the apparatus, and wherein the inlet polarizer comprises a bipolarizing prism and a quarter-wave plate or equivalent optical valve, and by the fact that a second recording medium is placed facing the bipolarizing prism to record a two-dimensional image of the object.

* * * * *

UNITED STATES PATENT AND TRADEMARK OFFICE
CERTIFICATE OF CORRECTION

PATENT NO. : 5,081,540
DATED : January 14, 1992
INVENTOR(S) : Dufresne et al.

It is certified that error appears in the above-identified patent and that said Letters Patent is hereby corrected as shown below:

In column 7 at line 22 delete "FIg." insert --FIG.--;

In column 7 at line 24 delete "margine" insert --margin--;

In column 13 at line 52 delete "Y=Arcisin [1/n] - i₁/n]"

insert --Y=Arcsin [1/n] - i₁/n]--.

Signed and Sealed this

Twenty-fifth Day of July, 1995

Attest:

BRUCE LEHMAN

Attesting Officer      Commissioner of Patents and Trademarks